United States Patent [19]
Jackson

[11] Patent Number: 5,982,641
[45] Date of Patent: Nov. 9, 1999

[54] HIGH-VOLTAGE POWER SUPPLY FOR VIDEO DISPLAY APPARATUS

[75] Inventor: David Ross Jackson, Indianapolis, Ind.

[73] Assignee: Thomson Consumer Electronics, Inc., Indianapolis, Ind.

[21] Appl. No.: 09/130,953

[22] Filed: Aug. 7, 1998

[51] Int. Cl.[6] .................... H02M 3/335; H01J 29/70
[52] U.S. Cl. ................. 363/21; 315/411; 363/97
[58] Field of Search ................. 363/15, 16, 20, 363/21, 74, 97, 131; 315/411

[56] References Cited

U.S. PATENT DOCUMENTS

| | | | |
|---|---|---|---|
| 4,394,722 | 7/1983 | Nero | 363/68 |
| 4,525,739 | 6/1985 | Fitzgerald | 358/190 |
| 4,531,181 | 7/1985 | Herz et al. | 363/21 |
| 4,559,481 | 12/1985 | Dietz | 315/411 |
| 4,644,230 | 2/1987 | Federle | 315/382 |
| 4,645,990 | 2/1987 | Willis | 315/411 |
| 4,658,342 | 4/1987 | Wharton | 363/21 |
| 4,825,129 | 4/1989 | Nero | 315/278 |
| 4,939,429 | 7/1990 | Rodriguez-Cavazos et al. | 315/411 |
| 5,010,281 | 4/1991 | Rodriguez-Cavazos | 315/411 |
| 5,034,667 | 7/1991 | Lendaro | 315/411 |
| 5,270,823 | 12/1993 | Heidebroek et al. | 358/190 |
| 5,418,705 | 5/1995 | Smith et al. | 363/56 |
| 5,420,777 | 5/1995 | Muto | 363/21 |
| 5,428,272 | 6/1995 | George et al. | 315/411 |
| 5,463,290 | 10/1995 | Fitzgerald | 315/411 |
| 5,602,447 | 2/1997 | Smith | 315/411 |

FOREIGN PATENT DOCUMENTS 0 483 432 A1  5/1992  European Pat. Off. ....... H02M 3/335

OTHER PUBLICATIONS

U.S. Patent Application entitled Synchronized High Voltage Generator, bearing attorney docket No. RCA 89,134, and filed on even date in the name of Ronald Eugene Fernsler.
Data sheet for the UC3842 integrated circuit, entitled High Performance Current Mode Controllers, published in 1996 by Motorola, Inc.
Color Monitor Service Manual for Models CH470, CH471, 1465DL, 1466LR, and 1466DM, pp. 34–37, published in Jun., 1994, by Goldstar.

*Primary Examiner*—Y. J. Han
*Attorney, Agent, or Firm*—Joseph S. Tripoli; Joseph J. Laks; Sammy S. Henig

[57] ABSTRACT

A high-voltage power supply of a video display apparatus provides an ultor voltage and a focus voltage to a cathode ray tube. A low-voltage power supply provides a variable voltage to a primary winding of a flyback transformer of the high-voltage power supply. The magnitude of the variable voltage is responsive to first and second feedback signals provided by first and second negative feedback paths. The first feedback signal is derived from the ultor voltage and is used to regulate the ultor voltage. The second feedback signal is provided by the low-voltage power supply via a path that bypasses the high-voltage power supply, and is summed with the first feedback signal to ensure that the focus voltage remains at or above a predetermined minimum voltage.

14 Claims, 5 Drawing Sheets

HIGH-VOLTAGE POWER SUPPLY FOR VIDEO DISPLAY APPARATUS

BACKGROUND

1. Field of the Invention

This invention relates generally to the field of high-voltage power supplies for video display apparatus, and, in particular, to the field of regulating voltages developed for cathode ray tubes used in video display apparatus, such as televisions, computer monitors, and the like.

2. Background Information

An electron gun in a cathode ray tube generates an electron beam that is used to scan information onto the screen of the cathode ray tube. The electron gun utilizes a focus voltage applied to a focus grid to adjust the diameter, also referred to as the "spot" or "spot size," of the electron beam. After being focused by the focus voltage at the focus grid, the electron beam is accelerated toward the screen of the cathode ray tube by the ultor voltage, also referred to as the anode voltage. The ultor voltage is applied to the cathode ray tube at the anode button, which is located on the bell-shaped portion of the cathode ray tube.

The ultor voltage in a video display apparatus is typically generated by the horizontal deflection system, which comprises a horizontal deflection circuit and a flyback transformer. Such a horizontal deflection system is conventional and will not be described further. In this approach, a horizontal retrace pulse voltage generated by the horizontal deflection circuit during its retrace mode of operation is applied to a primary winding of the flyback transformer. The horizontal retrace pulse voltage is stepped up by a high-voltage winding of the flyback transformer, and this stepped-up voltage is rectified and then filtered to provide the ultor voltage. The filtering is performed by an ultor capacitance, which may be provided by the capacitance formed between the inner and outer conductive coatings of the cathode ray tube.

An alternative approach to generating the ultor voltage is to utilize a dedicated high-voltage power supply. For example, in a video display apparatus that can support a range of horizontal scanning frequencies, it may be advantageous, for reasons relating to the complexity of the circuit design and the cost of materials, to utilize a separate high-voltage power supply to generate the ultor voltage. An example of a flyback type high-voltage power supply that may be used in video display apparatus is disclosed in U.S. Pat. No. 4,531,181. entitled HIGH VOLTAGE POWER SUPPLY and issued to Herz et al. The ultor voltage at the output of the high-voltage power supply is filtered by an ultor capacitance, which may be provided by the capacitance formed between the inner and outer conductive coatings of the cathode ray tube.

The high-voltage power supply disclosed in U.S. Pat. No. 4,531,181 utilizes negative feedback to regulate the ultor voltage. A resistor divider network divides the ultor voltage to provide a feedback signal that varies in proportion to changes in the level of the ultor voltage. This feedback signal is used to control a device which regulates the B+ input voltage to the high-voltage power supply. Thus, if the ultor voltage decreases in response to a higher beam current being drawn by the cathode ray tube, the B+ input voltage is increased, thereby increasing the ultor voltage. Conversely, if the ultor voltage increases in response to a lower beam current being drawn by the cathode ray tube, the B+ input voltage is decreased, thereby decreasing the ultor voltage.

A grid voltage, such as a focus voltage or a screen voltage, can then be generated from a so-called "focus screen" assembly, which is energized by the high-voltage winding of the flyback transformer to generate the focus and screen voltages for the cathode ray tube. The focus screen assembly may include a network of fixed resistors, variable resistors, and capacitors. A resistor chain of the focus screen assembly generates the required focus and screen voltages for the cathode ray tube. The component resistors of the focus screen assembly are deposited on a ceramic substrate, and the assembly is fully enclosed and insulated. The means for adjusting the variable resistors to set the screen and focus voltages are accessible from outside the case of the focus screen assembly.

U.S. Pat. No. 5,602,447, entitled CATHODE RAY TUBE FOCUS SUPPLY and issued to Smith, discloses three approaches for energizing a focus screen assembly: the resistor divider network approach, the peak detected approach, and an inventive combination of the resistor divider network and peak detected approaches. The high-voltage power supply disclosed in U.S. Pat. No. 4,531,181 uses the resistor divider network approach. This approach, shown in FIG. 1, entails energizing a plurality of series-connected resistances with the full ultor voltage. Some of the plurality of resistances may comprise variable resistances. The required focus and screen voltages are then set by adjusting these variable resistances.

The peak detected approach might also be used to generate the desired grid voltage. This approach, shown in FIG. 2, entails energizing a plurality of series-connected resistances from a tap of the high-voltage winding of the flyback transformer. For example, the tap for the focus voltage is typically chosen so that the focus voltage is approximately one-third of the ultor voltage;

in other words, the "focus ratio" is equal to approximately one-third. The voltage at the tap should be greater than the required focus voltage, so that an adjustment range is available. Again, some of the plurality of resistances may comprise variable resistances, and the required focus and screen voltages are then set by adjusting these variable resistances.

It has been empirically determined that, when the peak detected approach is used to generate voltages in a dedicated high-voltage power supply, the ultor capacitance may adversely affect the regulation of those voltages at the lower end of the range of beam current conditions. Specifically, at lower levels of screen brightness, and hence lower levels of beam current, the focus voltage may have a tendency to drop below an acceptable minimum level, resulting in artifacts on the screen of the cathode ray tube caused by spot defocusing of the electron beams. In addition, at such lower levels of beam current, the screen voltage may also tend to drop, thus resulting in a shift of the cathode ray tube's cutoff voltage, also referred to as its "black level."

For the foregoing reasons, there is a need for a high-voltage power supply that provides regulation of the voltages generated by the peak-detected approach to ensure that these voltages do not drop below a predetermined minimum level.

SUMMARY

The present invention is directed to a high-voltage power supply that satisfies the aforementioned need for regulation of the voltages generated by the peak-detected technique to ensure that these voltages do not drop below a predetermined minimum level.

According to a feature of the inventive arrangements described herein, a power supply for generating a plurality of voltages for a cathode ray tube comprises: means for generating a variable voltage; a transformer having a first terminal of a primary winding coupled to the variable voltage and a secondary winding for providing the plurality of voltages; a switch element coupled to a second terminal of the primary winding and switching at a periodic rate, so that energy is stored in the primary winding when the switch element conducts and the energy is transferred from the primary winding to the secondary winding when the switch element does not conduct, to provide the plurality of voltages; a first feedback path for coupling a first feedback signal that is representative of a first one of the plurality of voltages to the generating means for varying the variable voltage such that the first one of the plurality of voltages is regulated; and a second feedback path for coupling a second feedback signal that is representative of the variable voltage to the generating means for maintaining the variable voltage at or above a predetermined minimum level such that a second one of the plurality of voltages is regulated.

The first and second feedback signals may be summed at an input to the generating means. The secondary winding may comprise a split-diode type winding.

According to another feature of the inventive arrangements described herein, a high-voltage power supply for a video display apparatus comprises: means for generating a variable voltage responsive to a pulse-width modulated signal; a transformer having a first terminal of a primary winding coupled to the variable voltage and a secondary winding for providing an output voltage; a switch element coupled to a second terminal of the primary winding and switching at a periodic rate, so that energy is stored in the primary winding when the switch element conducts and the energy is transferred from the primary winding to the secondary winding when the switch element does not conduct, to provide the output voltage; a first feedback path for coupling a first feedback signal that is representative of the output voltage to the generating means for varying the duty cycle of the pulsewidth modulated signal responsive to the output voltage; and a second feedback path for coupling a second feedback signal that is representative of the variable voltage to the generating means for preventing the duty cycle of the pulse-width modulated signal from dropping below a minimum predetermined level.

The first feedback signal may be used to regulate the output voltage, and the second feedback signal may used to prevent the variable voltage from dropping below a predetermined minimum level. The first and second feedback signals may be summed at an input to the generating means.

According to yet another feature of the inventive arrangements described herein, an arrangement for providing power for a video-display apparatus comprises: a first switched-mode power supply for generating a variable voltage as a function of a duty cycle of a pulse-width modulated signal, the first switched-mode power supply comprising a first feedback path for preventing the variable voltage from dropping below a predetermined minimum level; and a second switched-mode power supply for generating a plurality of voltages for a cathode ray tube of the video display apparatus, the second switched-mode power supply comprising a transformer having a primary winding coupled to the variable voltage and a secondary winding for providing the plurality of voltages; wherein a second feedback path couples a feedback signal representative of one of the plurality of voltages to the first switched-mode power supply for regulating the one of the plurality of voltages by varying the variable voltage, and the operation of the first feedback path in preventing the variable voltage from dropping below a predetermined minimum level serves to regulate at least one of the other of the plurality of voltages.

The second feedback path may be coupled to the first feedback path at an input to the first switched-mode power supply.

The above, and other features, aspects, and advantages of the present invention will become apparent from the following description read in conjunction with the accompanying drawings, in which like reference numerals designate the same elements.

DESCRIPTION OF THE PREFERRED EMBODIMENTS

Figure 1:
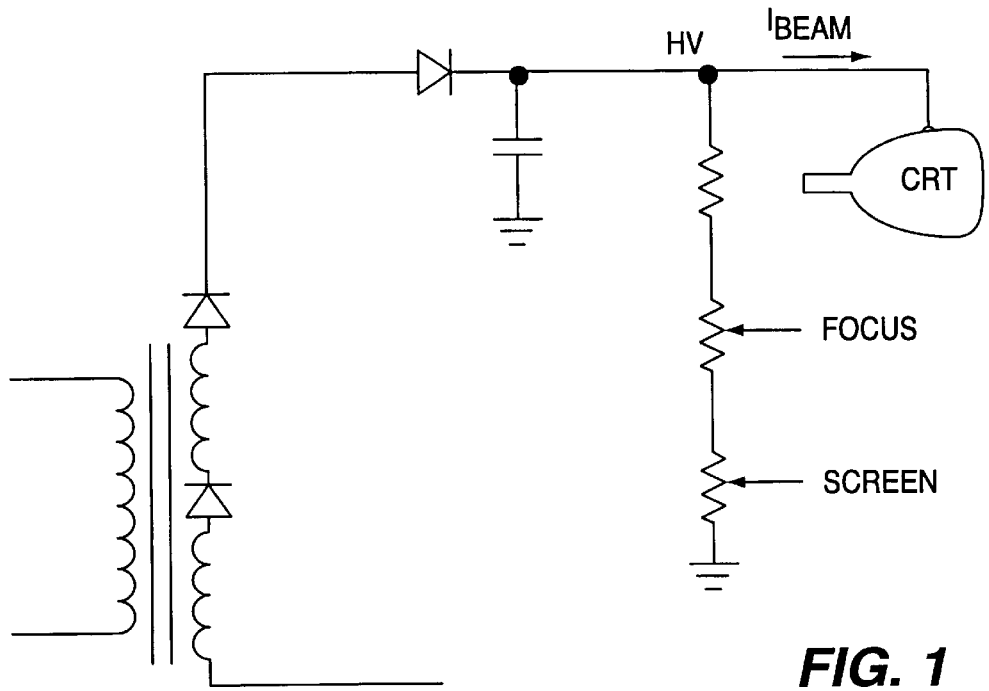
FIGS. 1 and 2 show prior art arrangements for generating a focus voltage for a cathode ray tube.
Figure 2:
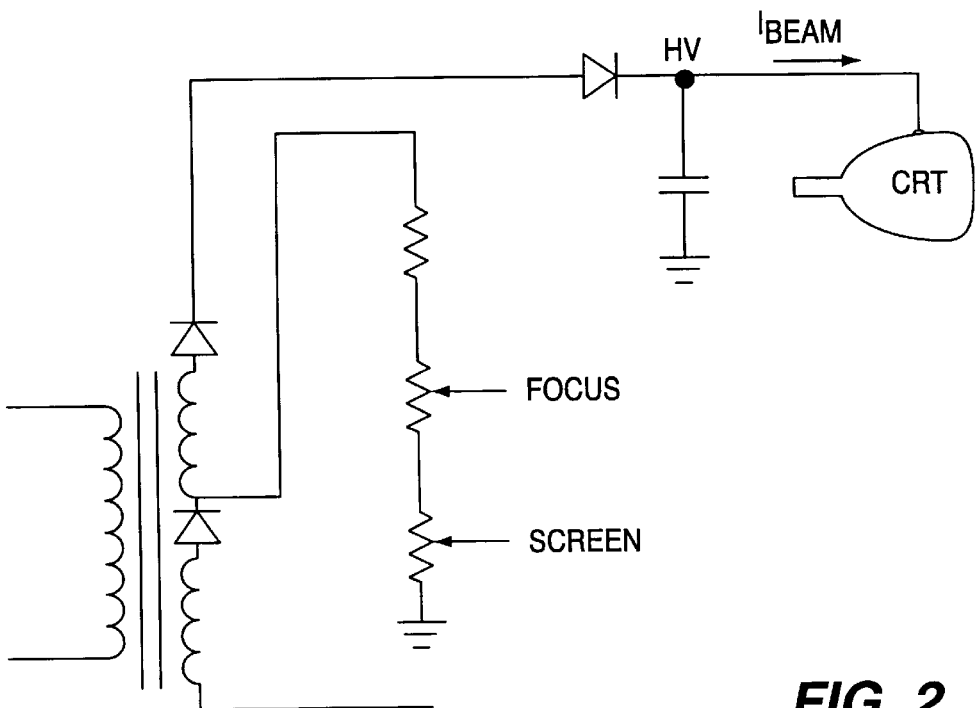
Figure 3:
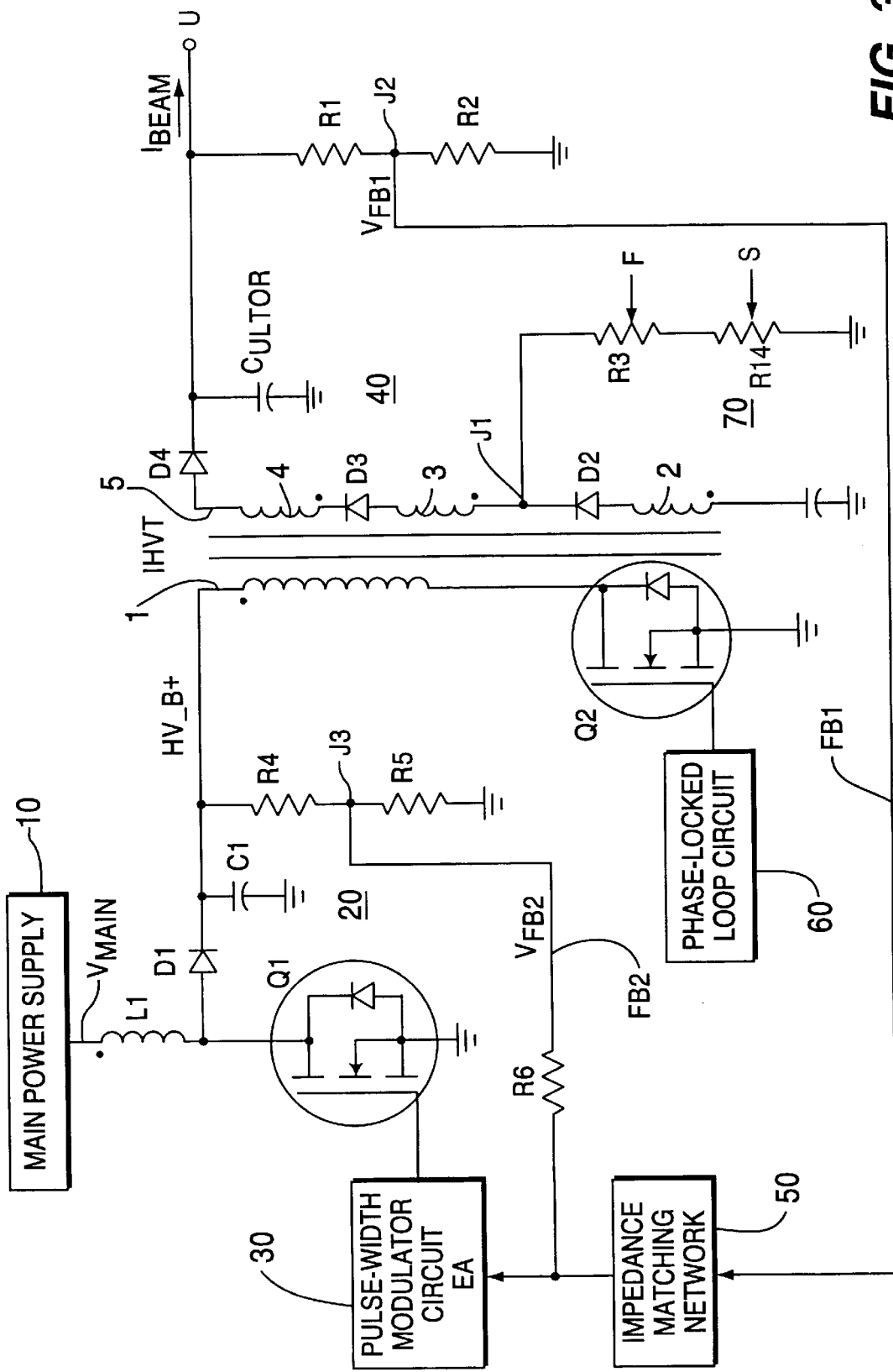
FIG. 3 is a diagram, in block and schematic form, of a high-voltage power supply according to the inventive arrangements described herein.

FIG. 3 shows an arrangement of a power supply system for a video display apparatus that is capable of supporting a range of horizontal scanning frequencies. A main power supply 10 provides a regulated voltage VMAIN, equal to approximately 70 V, for the video display apparatus. The voltage VMAIN is provided to several power supplies within the video display apparatus. For example, the voltage VMAIN is fed to the boost voltage regulator 20 formed by the pulse-width modulator circuit 30, the switch element Q1, the inductance L1, the diode D1, and the capacitor C1. The boost voltage regulator 20 converts the voltage VMAIN into the voltage HV_B+, which is the input voltage to the high-voltage power supply 40, in a manner that is well-known to those having ordinary skill in the art. The voltage HV_B+ varies between approximately 110 V and approximately 200 V over the range of scanning frequencies and load conditions of the high-voltage power supply 40.

The high-voltage power supply 40 operates, in a manner that is well-known to those having ordinary skill in the art, to generate the ultor voltage U, which is equal to approximately 32 kV. The flyback transformer IHVT is an integrated, high-voltage transformer with a split-diode type high-voltage winding 5, which comprises the winding segments 2, 3, and 4 separated by the diodes D2 and D3. The focus voltage F is derived from a focus tap at the junction J1 of the diode D1 and the winding segment 3 of the flyback transformer IHVT. The variable resistance R3 of the focus screen assembly 70 is adjusted to provide the desired focus voltage F. Similarly, the variable resistance R14 of the focus screen assembly 70 is adjusted to provide the desired screen voltage S.

Regulation of the ultor voltage U is accomplished by a first negative feedback path FB1 from the output of the high-voltage power supply 40 to the pulse-width modulator circuit 30. The ultor voltage U is divided by the resistances R1 and R2, and the resulting first feedback signal $V_{FB1}$ at the junction J2 of the resistances R1 and R2 is applied to the error amplifier input EA of the pulse-width modulator circuit 30 through the impedance matching network 50. The first feedback signal $V_{FB1}$ controls the duty cycle of the output pulses of the pulse-width modulator circuit 30, thereby controlling the conduction time of the switch element Q1 and, thus, the magnitude of the voltage HV_B+. The ultor voltage U varies responsive to, and in the direction of, the voltage HV_B+. Thus, the ultor voltage U increases as the voltage HV_B+ increases, and vice versa.

If the brightness of the screen of the cathode ray tube is low—for example, if the screen is black—the beam current required to be provided by the high-voltage power supply 40 is commensurately low. Therefore, the ultor capacitance C_ULTOR, the ultor voltage U, and the first feedback signal $V_{FB1}$ discharge very slowly. As a result, the pulse-width modulator circuit 30 reduces the duty cycle of its output pulses to a minimum level, for example, approximately 2%, within three switching cycles of the high-voltage power supply 40. The switch element Q1 thus only conducts for a minimum portion of its switching cycle and, consequently, the voltage HV_B+ drops.

Figure 5:
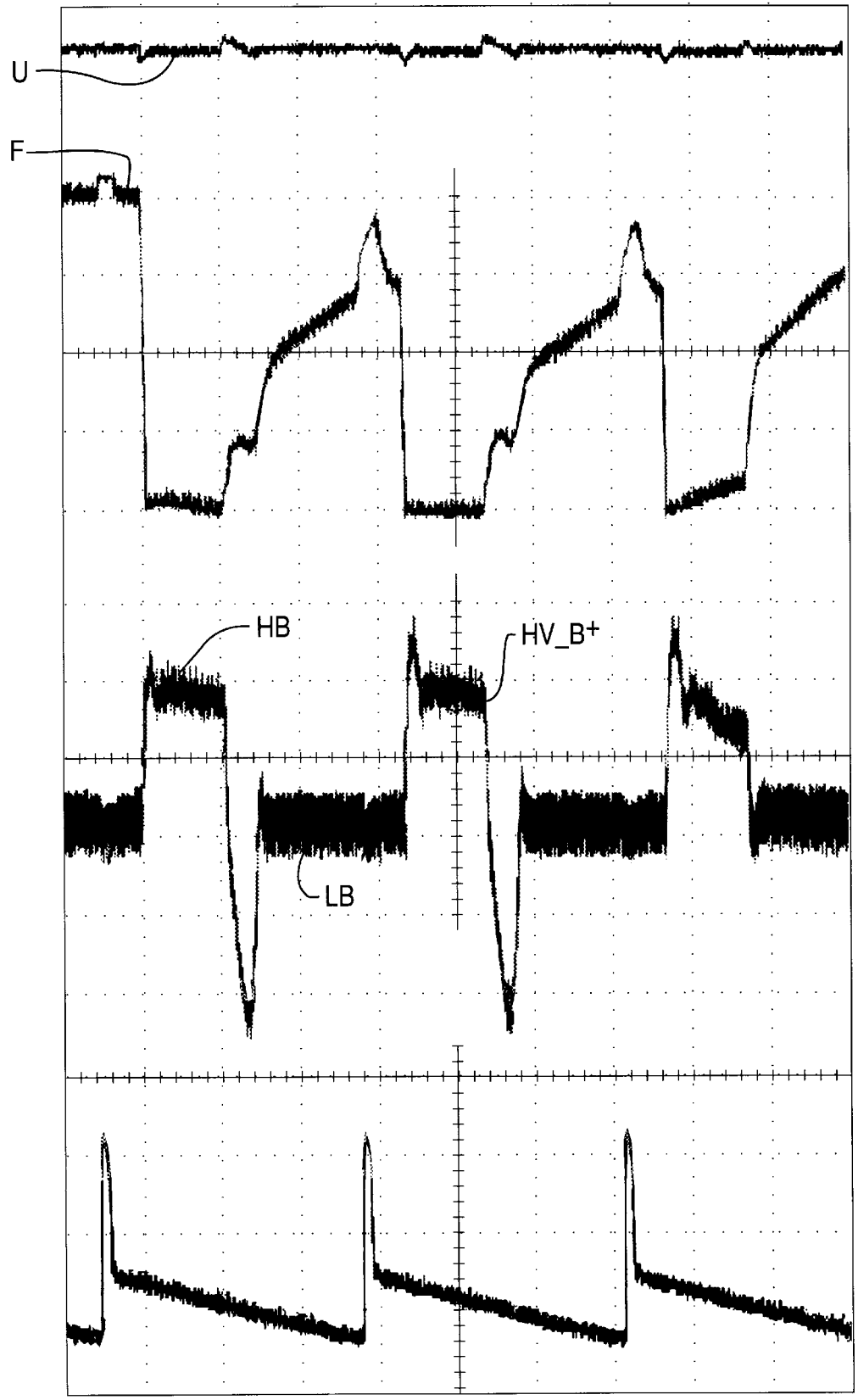
FIGS. 5 and 6 show voltage waveforms useful for explaining the inventive arrangements described herein.

As is well known to those having ordinary skill in the art, the peak amplitudes of the voltages induced in the winding segments 2, 3, and 4 by the flyback action of the flyback transformer IHVT are proportional to the magnitude of the voltage HV_B+. Therefore, as the voltage HV_B+ drops, the peak amplitudes of the voltages induced in the secondary windings 2, 3, and 4 also drop, until those peak amplitudes are no longer sufficient to turn on the diodes D2 and D3. The focus voltage F, for example, thus drops, as shown in FIG. 5, because it cannot be replenished by the energy from the winding segment 2. The drop in the focus voltage F may be, for example, on the order of several hundred volts. Such a drop in the focus voltage F, when the brightness of the screen of the cathode ray tube is low, may create a noticeable defocusing of the information displayed on the screen.

FIG. 5 shows voltage waveforms representative of the ultor voltage U, the focus voltage F, the voltage HV_B+, and a vertical deflection voltage from the vertical deflection yoke (not shown) of the video display apparatus. The ultor voltage U is shown at 2000 V/DIV; the focus voltage F is shown at 500 V/DIV; the voltage HV_B+ is shown at 20 V/DIV; and the vertical deflection voltage is shown at 20 V/DIV. The time base is 5 msec.

The upper area HB of the waveform representative of the voltage HV_B+ represents a high beam current condition and, conversely, the lower area LB represents a low beam current condition. FIG. 5 thus shows that, at the transition from the low to the high beam current condition, at the left edge of the area HB, the focus voltage F drops sharply, while the voltage HV_B+ increases to compensate for a slight decrease in the ultor voltage U. At the transition from the high to the low beam current condition, at the right edge of the area HB, the voltage HV_B+ drops below the area LB in response to an increase in the ultor voltage U. During the time that the voltage HV_B+ is below the area LB, the focus voltage F is at a level that is insufficient to properly focus the electron beam, and the voltage HV_B+ is insufficient to induce in the winding segment 2 of the flyback transformer IHVT a voltage having a peak amplitude that is adequate to turn on the diode D2 to replenish the focus voltage F.

Referring to FIG. 3, in accordance with a feature of the present invention, a second negative feedback path FB2, provided from the junction J3 of the resistances R4 and R5, advantageously couples a second feedback signal $V_{FB2}$, which is representative of the voltage HV_B+, to the pulse-width regulator circuit 30 through a feedback resistor R6. The resistors R4 and R5 divide the voltage HV_B+ to provide the second feedback signal $V_{FB2}$ at the junction J3 of the two resistors. The second feedback signal $V_{FB2}$ is coupled to the error amplifier input EA of the pulse-width modulator circuit 30 by the resistor R6. The first feedback signal $V_{FB1}$ and the second feedback signal $V_{FB2}$ are summed at the error amplifier input EA.

Figure 6:
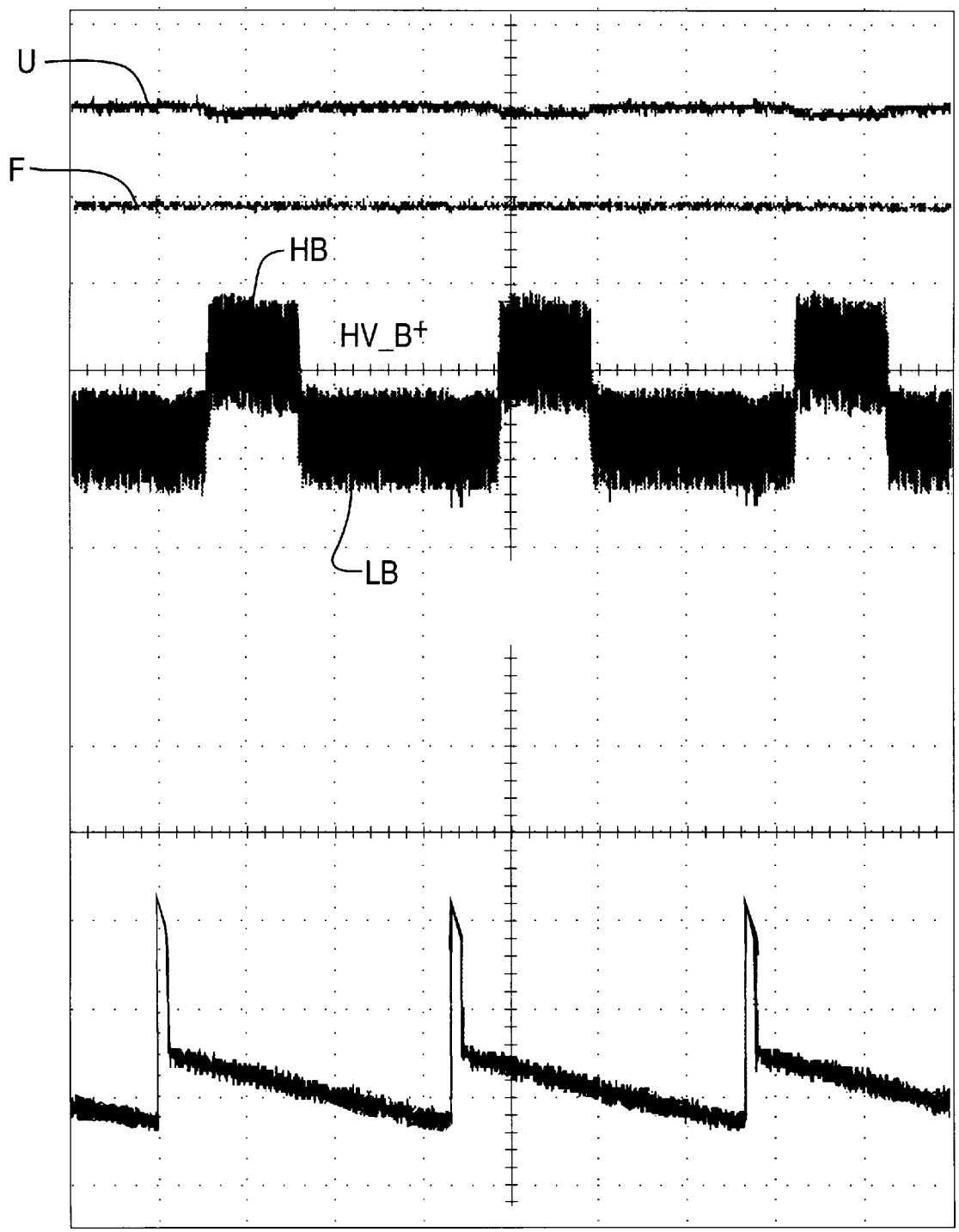

The second negative feedback path FB2 serves to prevent the voltage HV_B+ from dropping below a predetermined minimum level at a low beam current condition, for example, a beam current equal to approximately 50 μA. If the voltage HV_B+ tries to drop, the second feedback path FB2 causes the pulse-width modulator circuit 30 to increase the duty cycle of its output pulses. This, in turn, causes the switch element Q1 to increase its conduction time, and the voltage HV_B+ thereby increases. In this way the second feedback path FB2 advantageously prevents the voltage HV_B+ from decreasing below a predetermined minimum level, as shown in FIG. 6. The selection of appropriate values for the resistors R4 and R5 is determined by the choice of the predetermined minimum level below which the voltage HV_B+ will not fall.

By keeping the voltage HV_B+ at or above a predetermined minimum level, the peak amplitude of the voltage induced in the winding segment 2 remains at or above a predetermined minimum level. As a result, the focus voltage F is prevented from decreasing to a low enough level that spot defocusing of the electron beams becomes a problem, as shown in FIG. 6. Similarly, the screen voltage S is prevented from decreasing to a low enough level that the cathode ray tube's "black level" is significantly affected. The peak amplitude of the voltage induced in the winding segment 2 remains sufficiently high that the energy in the winding segment 2 is sufficient to turn on the diode D2 to replenish the focus voltage F and the screen voltage S when the switch element Q2 of the high-voltage power supply 40 is not conducting. The focus voltage F and the screen voltage S thus do not decrease during a low beam current condition of the video display apparatus.

At the same time, the peak amplitude of the voltage induced in the secondary winding 5 is either insufficient to turn on the diode D4, or the peak amplitude is just high enough that the diode D4 is barely conducting. Either way, as shown in FIG. 6, the ultor voltage U does not increase while the diode D2 is conducting to replenish the focus voltage F and the screen voltage S.

Figure 4:
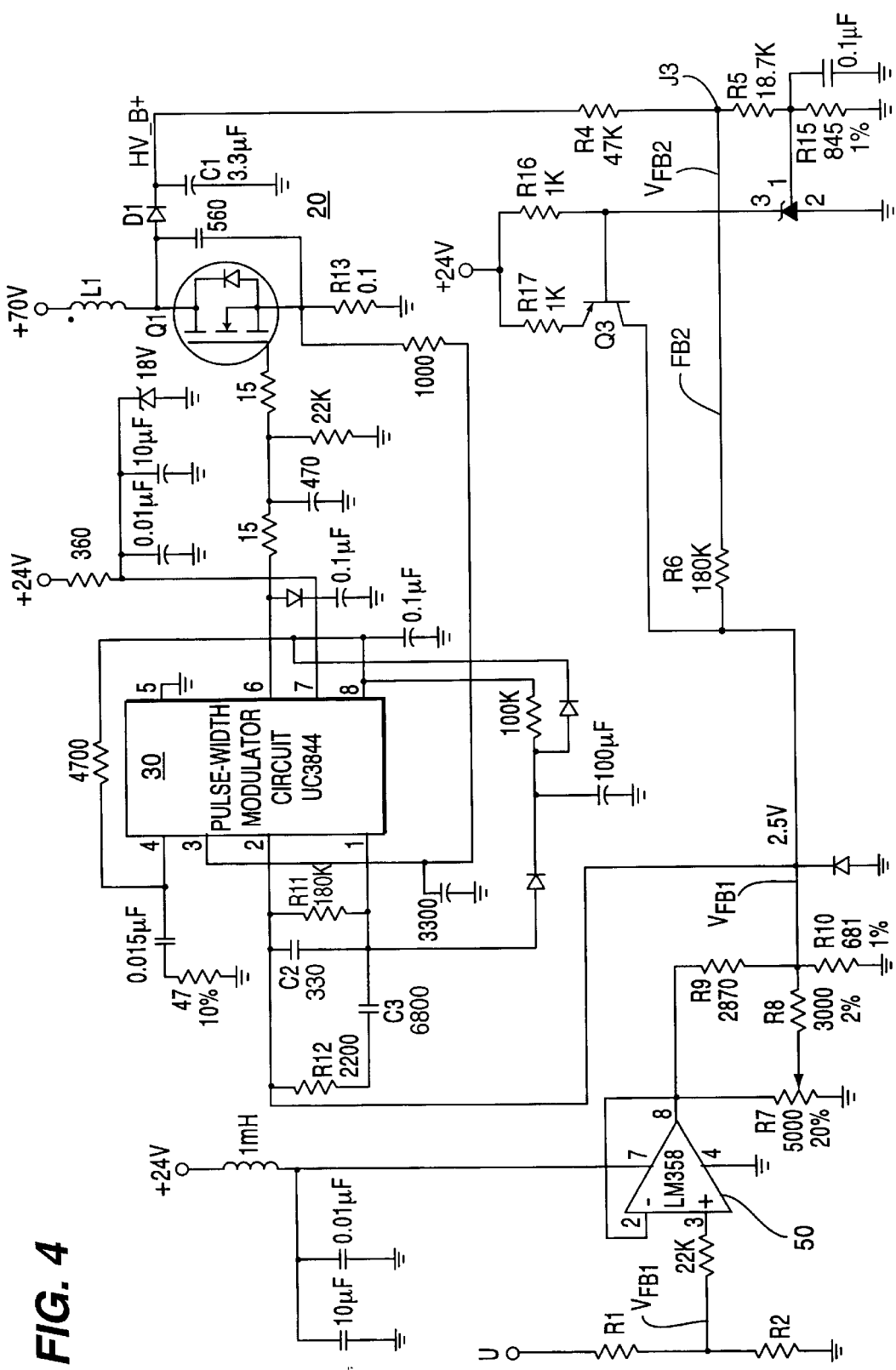
FIG. 4 shows a schematic diagram of the high-voltage power supply of FIG. 3.

A presently preferred embodiment of a high-voltage power supply according to the inventive arrangements described herein is shown in FIG. 4. The resistors R1 and R2 divide the ultor voltage U to provide the first feedback signal $V_{FB1}$. The high-voltage resistors R1 and R2 are dimensioned to divide the ultor voltage U by a factor of approximately 3000. The first feedback signal $V_{FB1}$ is applied to the pulse-width modulator circuit 30 through the impedance matching network 50, which in this preferred embodiment is implemented with a unity-voltage-gain buffer amplifier using the industry part number LM358 operational amplifier. The buffer amplifier 50 is required to match the source impedance of the resistors R1 and R2 to the input impedance of the pulse-width modulator circuit 30. The output impedance of the buffer amplifier 50 is equal to approximately 500 Ω. The low output impedance of the buffer amplifier 50, as compared to the impedance of the feedback resistor R6, ensures that the influence of the second negative feedback path FB2 is significant only at a low beam current condition. At increased beam current levels, the first negative feedback path FB1 dominates the second negative feedback path FB2.

The output voltage of the buffer amplifier 50 is divided by the resistors R9 and RIO to provide the first feedback signal VFB1 to the pulse-width modulator circuit 30. The effect of the tolerances of the circuit components in the first negative feedback loop FB1 on the first feedback signal VFB1 are nulled out by the resistances R7 and R8.

In the exemplary embodiment shown in FIG. 4, the pulse-width modulator circuit 30 is implemented using a n industry part number UC3842 current-mode controller integrated circuit. The first feedback signal VFB1 is applied to pin 2 of the UC3842 controller IC, which is the inverting input of the error amplifier. The frequency response of the error amplifier of the pulse-width modulator circuit 30 is defined by the compensation network, formed by the resistors RII and R12 and the capacitors C2 and C3, provided between pins 1 and 2 of the UC3842 current-mode controller IC. In the embodiment of FIG. 4, the compensation network provides a high gain at low frequencies, and then rolls off the gain at approximately 10 dB per decade beginning at approximately 2 kHz. The compensation network provides for a unity-gain crossover at a frequency equal to approximately 16 kHz.

The non-inverting input of the UC3842 controller IC is internally biased at approximately 2.5 V dc. The UC3842 thus responds to the first feedback signal VFB1 by changing the duty cycle of its output pulses at pin 7, and hence the conduction time of the switch element Q1, such that the ultor voltage U is varied to maintain the first feedback signal VFB1 equal to approximately 2.5 V. The current flowing through the inductor LI and the switch element Q1 is sensed by the resistor R13. The resulting voltage developed across the resistor R13 is coupled to pin 3 of the UC3842 current-mode controller IC, and is used to terminate conduction of the switch element Q1 when the peak current flowing through the inductor L1 exceeds a threshold level.

The voltage HV_B+ is divided by the resistors R4 and R5 to provide the second feedback signal VFB2. The second feedback signal VFB2 is coupled to the non-inverting input of the error amplifier at pin 2 of the UC3842 current-mode controller by the resistor R6. The first feedback signal VFB1 and the second feedback signal VFB2 are summed at pin 2 of the UC3842 current-mode controller.

Referring again to FIG. 4, in the event of a loss of the ultor voltage U, either by design—such as when an X-ray protection circuit is activated—or by a fault in the high-voltage power supply 40, the first negative feedback path FB1 will cause the voltage HV_B+ to try to increase to compensate for the decrease in the ultor voltage U. Under these conditions, an overvoltage regulator circuit 80 is activated. The increase in the voltage HV_B+ causes the voltage at the junction J4 of the resistors R5 and R15 and the voltage regulator VR1 to rise from a value of approximately 1.7 V to a value of approximately 2.5 V. The voltage regulator VR1 thus will operate in its active range, and the transistor Q3 will consequently begin to conduct current to pin 2 of the UC3842 current-mode controller. The voltage at pin 2 remains at 2.5 V, as previously described, and the voltage HV_B+ remains limited to an upper value that is equal to approximately 200 V.

In the presently preferred embodiment, the voltage regulator VR1 is implemented using an active circuit, for example an industry part number TL431 adjustable precision shunt regulator. The use of an active circuit in the overvoltage regulator circuit 80 advantageously permits a much tighter regulation of the upper value of the voltage HV_B+ than is available with a conventional Zener diode. The improvement in regulation may be equal to approximately 2.5%, and this improvement is advantageously achieved without the drawback of the overvoltage regulator circuit 80 partially conducting under a normal, but high, peak beam current condition that may occur in modes where the video display apparatus operates at a horizontal scanning frequency that is higher than the NTSC standard horizontal scanning frequency.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

I claim:

1. A power supply for generating a plurality of voltages for a cathode ray tube, said power supply comprising:

means for generating a variable voltage;

a transformer having a first terminal of a primary winding coupled to said variable voltage and a secondary winding for providing said plurality of voltages;

a switch element coupled to a second terminal of said primary winding and switching at a periodic rate, so that energy is stored in said primary winding when said switch element conducts and said energy is transferred from said primary winding to said secondary winding when said switch element does not conduct, to provide said plurality of voltages;

a first feedback path for coupling a first feedback signal that is representative of a first one of said plurality of voltages to said generating means for varying said variable voltage such that said first one of said plurality of voltages is regulated; and a second feedback path for coupling a second feedback signal that is representative of said variable voltage to said generating means for maintaining said variable voltage at or above a predetermined minimum level such that a second one of said plurality of voltages is regulated.

2. The high-voltage power supply of claim 1, wherein said first and second feedback signals are summed at an input to said generating means.

3. The power supply of claim 2, wherein said first one of said plurality of voltages comprises an ultor voltage for said cathode ray tube.

4. The power supply of claim 3, wherein said second one of said plurality of voltages comprises a grid voltage for said cathode ray tube.

5. The power supply of claim 4, wherein said grid voltage comprises one of a focus voltage and a screen voltage.

6. The power supply of claim 5, wherein said secondary winding comprises a split-diode type winding.

7. A high-voltage power supply for a video display apparatus, said high-voltage power supply comprising:

means for generating a variable voltage responsive to a pulse-width modulated signal;

a transformer having a first terminal of a primary winding coupled to said variable voltage and a secondary winding for providing an output voltage;

a switch element coupled to a second terminal of said primary winding and switching at a periodic rate, so that energy is stored in said primary winding when said switch element conducts and said energy is transferred from said primary winding to said secondary winding when said switch element does not conduct, to provide said output voltage;

a first feedback path for coupling a first feedback signal that is representative of said output voltage to said generating means for varying the duty cycle of said pulse-width modulated signal responsive to said output voltage; and a second feedback path for coupling a second feedback signal that is representative of said variable voltage to said generating means for preventing said duty cycle of said pulse-width modulated signal from dropping below a minimum predetermined level.

8. The high-voltage power supply of claim 7, wherein said first feedback signal is used to regulate said output voltage.

9. The high-voltage power supply of claim 8, wherein said second feedback signal is used to prevent said variable voltage from dropping below a predetermined minimum level.

10. The high-voltage power supply of claim 9, wherein said first and second feedback signals are summed at an input to said generating means.

11. An arrangement for providing power for a video-display apparatus, said arrangement comprising:

a first switched-mode power supply for generating a variable voltage as a function of a duty cycle of a pulse-width modulated signal, said first switched-mode power supply comprising a first feedback path for preventing said variable voltage from dropping below a predetermined minimum level; and a second switched-mode power supply for generating a plurality of voltages for a cathode ray tube of said video display apparatus, said second switched-mode power supply comprising a transformer having a primary winding coupled to said variable voltage and a secondary winding for providing said plurality of voltages;

wherein:

a second feedback path couples a feedback signal representative of one of said plurality of voltages to said first switched-mode power supply for regulating said one of said plurality of voltages by varying said variable voltage; and the operation of the first feedback path in preventing said variable voltage from dropping below a predetermined minimum level serves to regulate at least one of the other of said plurality of voltages.

12. The arrangement of claim 11, wherein said second feedback path is coupled to said first feedback path at an input to said first switched-mode power supply.

13. The arrangement of claim 12, wherein said one of said plurality of voltages comprises an ultor voltage for a cathode ray tube.

14. The arrangement of claim 13, wherein said at least one of the other of said plurality of voltages comprises one of a focus voltage and a screen voltage.

* * * * *